United States Patent [19]
Robinson et al.

[11] Patent Number: 4,734,697
[45] Date of Patent: Mar. 29, 1988

[54] MOTOR VEHICLE TAIL LIGHT ASSEMBLY WITH DIMMER CONTROLLER

[76] Inventors: Melvis I. Robinson; Kent B. Robinson, both of 18230 Kingsdale, Redondo Beach, Calif. 90278

[21] Appl. No.: 889,388

[22] Filed: Jul. 25, 1986

[51] Int. Cl.⁴ .............................. B60Q 1/22; B60Q 1/44
[52] U.S. Cl. ........................................ 340/902; 340/66; 340/67; 307/10 LS
[58] Field of Search ........................ 340/67, 66, 74, 97, 340/110, 111, 107, 902; 307/10 LS

[56] References Cited

U.S. PATENT DOCUMENTS

| | | | |
|---|---|---|---|
| 1,629,425 | 5/1927 | Wardhaugh | 340/110 |
| 1,879,057 | 9/1932 | Bray | 340/97 |
| 2,878,462 | 3/1959 | Tralli | 340/107 |
| 3,192,437 | 6/1965 | Meyer | 340/902 X |
| 3,395,388 | 7/1968 | Hendrickson | 340/66 X |
| 3,501,742 | 3/1970 | Ellison | 340/66 X |
| 3,678,457 | 7/1972 | Lev | 340/110 X |
| 3,750,138 | 7/1973 | Burgan et al. | 340/97 X |
| 3,787,808 | 1/1974 | Knopf | 340/66 |
| 3,793,621 | 2/1974 | McIntosh | 340/902 X |
| 4,249,160 | 2/1981 | Chilvers | 307/10 LS X |
| 4,574,269 | 3/1986 | Miller | 340/97 |
| 4,683,403 | 7/1987 | Iwamoto et al. | 307/10 LS X |

Primary Examiner—Charles A. Ruehl
Assistant Examiner—Brian R. Tumm
Attorney, Agent, or Firm—G. Donald Weber, Jr.

[57] ABSTRACT

A rear mounted, brake light assembly which includes, inter alia, brake lights, back-up lights, turn signals and a signal for indicating that a following vehicle has its high beam or bright lights on.

6 Claims, 4 Drawing Figures

U.S. Patent  Mar. 29, 1988  4,734,697
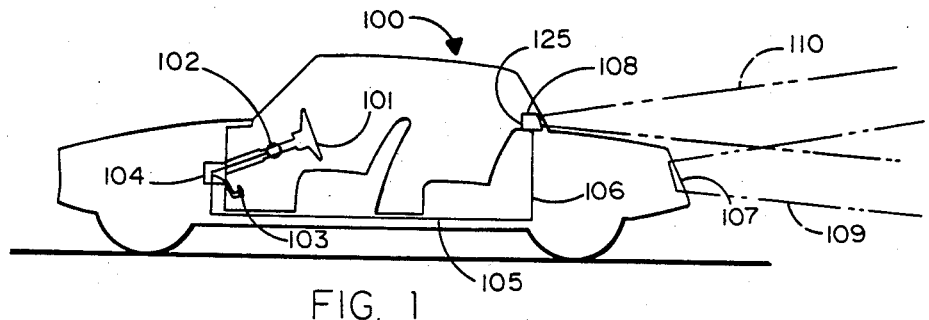
FIG. 1
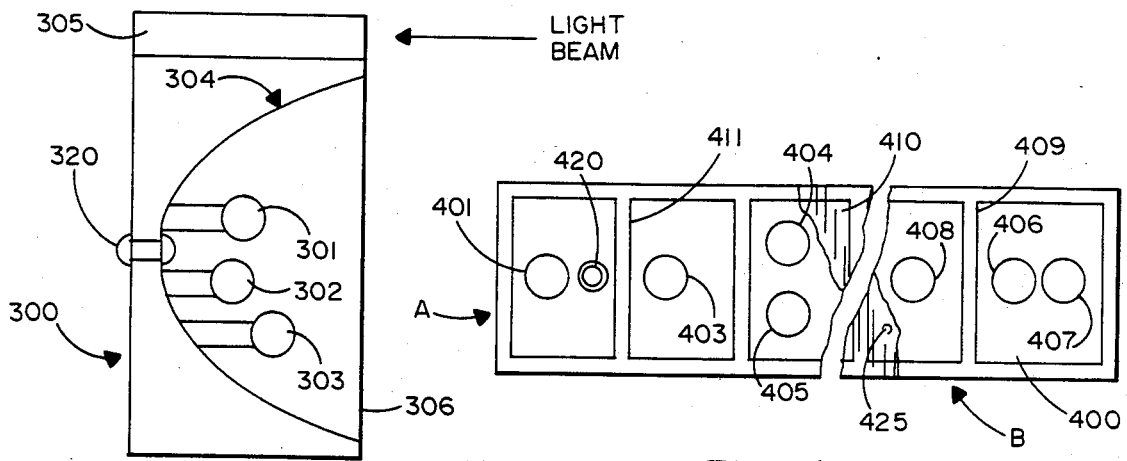
FIG. 3
FIG. 4
| | | | O | | |
|---|---|---|---|---|---|
| A | RED $O_{R_3}$ | RED $O_{R_1}$ | WHITE $O_W$ | RED $O_{R_2}$ | RED $O_{R_4}$ |
| B | AMBER $O_{A_1}$ | RED $O_{R_3}$ | WHITE $O_W$ | RED $O_{R_4}$ | AMBER $O_{A_2}$ |
| C | RED O | AMBER O | WHITE O | AMBER O | RED O |
| D | RED O | WHITE O | RED O | WHITE O | RED O |
| E | AMBER O | WHITE O | RED O | WHITE O | AMBER O |
| F | WHITE O | RED O | RED O | RED O | WHITE O |
| G | WHITE O | AMBER O | RED O | AMBER O | WHITE O |
FIG. 2

MOTOR VEHICLE TAIL LIGHT ASSEMBLY WITH DIMMER CONTROLLER

BACKGROUND

1. Field of the Invention

This invention is directed to an eye level, rear mounted light assembly for use with motor vehicles, in general, and to such a light assembly which incorporates along with one or more brake lights, back-up lights, turn signals and a high beam deterrent light, in particular.

2. Prior Art

There are many variations of the newly legislated eye level, rear mounted brake lights which are used in vehicles. These lights are mounted at or adjacent to the rear window in most, if not all, passenger vehicles which have been manufactured since 1985.

The purpose of the existing eye level brake lights is to provide a greater safety factor for drivers of motor vehicles and to reduce rearend collisions. That is, the eye level brake light is more readily visible to drivers of following vehicles both during the daytime and night time. That is, the eye level brake light is displayed at or about the eye level of a following passenger vehicle. This eye level light is much more visible because of its prominence with respect to the driver of the following vehicle.

Ordinary tail lights tend to be less effective during the daylight hours because of the location of the light assemblies. In addition, ambient light diminishes the daytime effect. Ordinary tail lights tend to be less effective during the evening or night time hours in many situations of traffic, e.g. close quarters during rush hours. However, the eye level brake light is rarely, if ever, obscured by traffic conditions. Also, the comparative relationship to ambient light is enhanced because of the position of this light.

This eye level light has been legislatively mandated in most vehicles which are driven in the United States. However, these brake lights are usually limited to brake light operations only. Consequently, they provide a very limited amount of information, i.e. that the pertinent vehicle is in the process of stopping. While this is very important information, it may be considered to be, essentially, one dimensional.

Another problem which is frequently encountered in traffic is that the following vehicle has the high beam lights on to the annoyance and discomfort of the forward vehicle as well as, in many cases, creating an unsafe condition by blinding (even temporarily) the forward vehicle. While there is provision for changing most of the rear view mirrors within the car from a day to a night position to diminish the effect of the high beam, this also has the effect of diminishing the visibility of any lights from following vehicles. Consequently, this is not a favored solution.

In similar fashion, the side mounted rear view mirrors can be moved either directly or remotely. However, this creates an unsafe condition inasmuch as a type of "tunnel vision" is achieved.

Moreover, in some cases, the driver of the vehicle with the high beams is not even aware of the situation. In practice, one of the methods of communicating this condition is for the offended driver to give a hand signal adjacent to the mirror. Another signal which is sometimes used is the flashing of the brake lights by means of stepping on the brake pedal. Obviously, neither of these solutions is adequate and, sometimes, creates emotional problems for each of the drivers without effecting the desired condition. Consequently, it is desirable to achieve a method of communicating with the following driver that the high beam signal condition exists. One method of communication, much like that given to an oncoming driver, i.e. flashing a white low and high beam at the offender.

SUMMARY OF THE INSTANT INVENTION

This invention is directed to a modified eye level, rear mounted brake light which includes a back-up light, a high beam deterrent light turn signals and/or emergency flashers.

The turn signals and emergency flashers can be operated in conjuction with the existing turn signals in the lights already available in the vehicle.

The high beam deterrent light is, or can be, selectively used as a backup light or the like. However, the high beam deterent light is selectively switched from a bright to a dim light condition. The back-up light, similar to the turn signals and emergency flashers, can be operated in conjunction with the existing back-up lights already available on the vehicle.

BRIEF DESCRIPTION OF THE DRAWINGS

FIG. 1 is a schematic representation of a vehicle with the light assembly of the instant invention mounted therein.

FIGS. 2A through 2G are schematic representations of arrangements of the brake light of the instant invention.

FIG. 3 is a schematic cross sectional view of one embodiment of the instant invention.

FIG. 4 is a plan view of one embodiment of the instant invention.

DESCRIPTION OF A PREFERRED EMBODIMENT

Referring now to FIG. 1, there is shown a schematic diagram of a standard passenger vehicle 100. This vehicle includes all of the components which are usually found in a vehicle, most of which will not be described herein.

The vehicle includes a steering wheel and column apparatus 101 on which there is mounted a control mechanism 102. In addition, a brake pedal 103 of standard or conventional design is included. A control apparatus 104 is connected to either the control mechanism 102, the brake pedal 103 or both.

The control mechanism 104 is connected by means of wires or other suitable conductors 105 and 106 to the existing and conventional tail lights 107 and the eye level brake light 108 of the instant invention respectively.

In the conventional automobile system, the mechanism 102 is the steering column mounted switch which controls, inter alia, the turn signals in a conventional manner. The control mechanism 104 is adapted to control the brake lights 107 in conjunction with the operation of brake pedal 103. Thus, the appropriate control signals are supplied from mechanism 102 and mechanism 104 through conductor 105 to brake light 107 and through conductor 106 to brake light 125. All of this apparatus is conventional.

In addition, it is contemplated that an automatic light detector/sensor 108 can be disposed adjacent to light assembly 125. The sensor 108 is arranged to detect an incident light beam of a particular nature, i.e. a high beam light. The sensor 108, when thus activated, will operate to automatically control the dimmer/deterrent light assembly as described hereinafter.

The conventional brake lights 107 produce the light beam or pattern 109 while the eye level light 108 produces the light beam 110. Light beams 109 and 110 are shown in dashed outline for convenience. It is also seen that the eye level brake light 108 tends to be somewhat more apparent to the driver of a following vehicle.

Referring now to FIGS. 2A through 2G, there is shown, schematically, a representation of elevational views of various configurations of the eye level light assembly 108 shown in FIG. 1. In FIG. 2A, the light assembly 108 may have any suitable housing (not shown) and may include a plurality of lenses or luminaires mounted therein. In FIG. 2A, the apparatus has five units or sections depicted. These sections include a central section W which has a white lens and produces a white color to the observer. Of course, this section can be formed of a blue light or any other suitable color. On either side of the centrally located white section are a plurality of red sections R1 through R4. These sections, when illuminated, produce a red light beam or glow. The red glow can be produced by a standard bulb with a red lens.

It should be understood, of course, that the adjacent pairs of red segments (i.e. segments R1 and R3, R2 and R4) can be combined as a single red segment so that, in effect, the device of FIG. 2A comprises three different sections.

In the embodiment shown in FIG. 2A, the white segment W is, typically, a back-up light and, as well, the high beam deterrent light. The inner red sections R1 and R2 can operate as the brake lights while the outer red sections R3 and R4 can operate as the turn signals. Thus, the outer or turn signal sections R3 and R4 are connected to the control box 102 at the interior of the car while the internal red sections R1 and R2 are connected to the control mechanism 104 which is activated when the brake pedal 103 is activated.

The white section W is, typically, controlled by the control mechanism 102 at the steering column. For example, with a back up light arrangement, the white light would be illuminated when the gear mechanism is placed in reverse. In addition, to provide the high beam deterrent apparatus, an additional switch can be included in the steering column mounted light control mechanism 102, or as a separate switch (not shown) on the dash board or the like, or the automatic controller 108.

In a preferred embodiment, the high beam deterrent light has one or more desirable operational characteristics. In a first operation, the high beam deterrent light is merely switched from a high to a low beam effect, in essence, to attract the attention of the following driver to indicate that the high beams in that car are operative. This can be effected by including a typical flasher circuit in the white light lens. Thus when the high beam deterrent light switch is operated or activated, the high beam deterrent light is automatically caused to flash on and off (or high and low) to signal the following driver.

In an alternative arrangement, the white light device is operated by flashing on and off, to produce a strobe light effect. Again, this can be produced by inserting a timer element in the circuit directed to the white light.

In an alternative arrangement shown in FIG. 2B, the white or high beam deterrent light is again centrally located and is flanked by red colored brake lights R3 and R4. This combination is flanked, on either side, by amber colored lights A1 and A2 which would then operate as turn signals or emergency flashers in the standard or conventional fashion. That is, the turn signals are connected to the turn signal apparatus which is used to operate the other lights in the vehicle. Likewise, the brake light portions of the light 125 are also operated in conjunction with the conventional brake lights in the rear of the vehicle.

FIG. 2C shows an alternative embodiment wherein the brake light and turn signals (i.e. red and amber lights) are reversed in position.

In an alternative arrangement, FIG. 2D shows a structure wherein the central light portion is arranged to produce a red light while the light sections on either side thereof produce white lights and the flanking light segments produce red light. In this arrangement, the red center light operates as a brake light in much the same fashion as the brake lights in the conventional eye level brake light arrangement. In the embodiment shown in FIG. 2D, the exterior red lights can operate as turn signals in a manner similar to conventional turn signal operation.

The pair of white lights or white light segments each operate as the white light segment shown in FIGS. 2A through 2C. However, a pair of white light segments is provided to permit a more definitive presentation of light from the rear of the vehicle. This will be more effective in the case of back-up lights. It may also have a greater effect on the driver of the following vehicle.

FIG. 2E is similar to the assembly of FIG. 2D with the exception that the turn signal segments are depicted as being amber instead of red. (This is more typical in non-U.S. vehicles.)

In FIG. 2F, the light arrangement has a centrally located red light segment which operates as a brake light. This centrally located segment is flanked by two red light segments which operate as turn signals in the conventional sense. These red light segments are flanked by a pair of white light segments which function in the same fashion as the pair of white light segments shown and described in FIG. 2E. However, by placing these white lights at the outer reaches of the eye level brake light, greater advantages are obtained, such as better distribution of light in the back-up mode and so forth.

The light segment arrangement of the brake light assembly in FIG. 2G is similar to that shown in FIG. 2F except that the turn signal portions of the light are arranged to be amber segments rather that red segments (e.g. for foreign vehicles).

In summary, the red lens segments of the light will always be used for the brake light and possibly for turn signals. Conversely, of course, the brake light will always be a red light segment. Likewise, the amber lens segments, if used, will always be used for turn signals and/or emergency flashers.

The white lens or light segments will always be used for the backup light and the high beam deterrent light apparatus.

Referring now to FIG. 3, there is shown a schematic cross-sectional view of one embodiment in the invention. In this instance, the housing for the light is shown as housing 300. Other conventional designs can be utilized. In this configuration, reflector 304 is mounted in the housing. The light bulbs 301, 302 and 303 are shown, schematically, mounted in the reflector and housing. These bulbs are used depending upon the type of apparatus which is used in the light apparatus.

Also, the automatic light monitor 305 is shown, schematically, mounted adjacent to the light assembly. The monitor 305 is operative to receive and operate upon an incoming high beam light. That is, in response to the high beam light, the monitor will selectively activate the dimmer/deterrent light or lights which are directed to the following vehicle with the high beam lights. The dimmer/deterrent light or lights may flash as described elsewhere.

In addition, a suitable indicator 320 is provided to permit the vehicle driver to determine which lights in the light assembly are operative. This indicator can be a light pipe, an aperture or the like, through housing 300.

Referring concurrently to FIG. 4, there is shown another, composite, and illustrative, arrangement of the light assembly. In this case, the housing 400 is shown schematically, and may be considered to be equivalent to housing 300. Housing 300 and/or 400 include an internal reflective surface which may be parabolic, or the like, if so desired.

Intermediate section dividers or walls are shown in FIG. 4. These dividers 409, 410 and 411 can be included between various light segments in order to avoid spill over of light from one segment to another thereby to avoid ambiguity.

The light bulb layout in FIG. 4 is representative of a composite of light bulb arrangements shown in one or more of the specific embodiments shown in FIG. 2. For example, the A portion of the assembly shown in FIG. 4 is comparable to the light bulb arrangements which would be utilized in devices represented by FIGS. 2A, 2B and 2C. The B portion of FIG. 4 is representative of the light bulb arrangements found in FIGS. 2F and 2G. Of course, the light bulb arrangements shown in FIGS. 2D and 2E are variations thereon. Thus, as shown in segment A in FIG. 4, the light bulbs 401, 403, 404 and 405 are equivalent to the light bulbs which are shown assembly segments of FIGS. 2A, 2B and 2C.

The showing in section B of FIG. 4, merely permits the light bulbs 406 and 407 to be mounted horizontally rather than vertically. Also, it should be recognized that three light bulbs 301, 302 and 303 can be mounted vertically (or horizontally) as shown in FIG. 3. The number of bulbs which are used in any particular light segment is, inter alia, a function of the type of controls which are used elsewhere in the circuit. For example, if light bulbs 302 and 403 are considered to be the light bulb in the red brake light section of the light fixtures shown in FIGS. 2A and 2B, a single bulb is all that is required in order to illuminate that segment and to effect a brake light operation.

Similarly, light bulb 401 will suffice as the brake light in FIGS. 2C and 2D. In similar fashion, light bulbs 401 and/or 403 will function as the turn signal lights in the red or amber portion of the respective light elements shown in FIG. 2.

The light bulbs 404 and 405 are shown vertically stacked and are equivalent to the light bulbs 301 and 303 in FIG. 3. Light bulbs 406 and 407 are shown horizontally stacked and will operate in the same fashion although the visual effect may be somewhat different. In fact, horizontal stacking may be preferrable in order to reduce the overall height of the assembly thereby to avoid obscuring the rear window of the vehicle. Thus, bulb 404 can be used as the backup light and bulb 405 as the flashing light in the deterrent light portion. Conversely, bulbs 404 and 405 can be reversed in operation. Otherwise, light bulbs 404 and 405 can be alternatively flashed with first 405 lit and then 404 lit during the high beam deterrent operation. However, the mechanism and the arrangement of the light flashing apparatus is something which can be addressed in the ultimate design, including the relative positions of the bulbs and the reflector.

Thus, there is shown and described a new and unique eye level, brake light which is used in motor vehicles. The light apparatus permits the use of the eye level light assembly as a brake light as is conventional. In addition, the eye level assembly functions as a turn signal, as a backup light and, as a signaling apparatus to a following driver to indicate when his or her high beams are used inappropriately.

It is understood that those skilled in the art may develop and design modifications or changes in this invention. For example, the number of light bulbs, the interaction between the light bulbs, the specific control mechanism, and any indicators internal in the vehicle to indicate the status of the eye level brake lights are possible. However, any such modifications or changes which fall within the purview of this description are intended to be included therein as well. The description herein is intended to be illustrative only and is not intended to limitative. Rather, the scope of the application is limited only by the claims appended hereto.

We claim:

1. A light assembly for rear mounted, eye level use with motor vehicles, comprising, housing means, a plurality of light emitting devices mounted in said housing means, lens cover means mounted at said housing means and comprising a plurality of sections having different colors whereby a selected color indication is produced when at least one of said plurality of light emitting devices is selectively activated, said color indication having a recognized conventional safety characteristic to motorists, reflector means disposed in said housing means adjacent to said light emitting devices for reflecting light from said light devices outwardly through said lens cover means, control means for selectively activating said plurality of light emitting devices, said control means includes switch means for selectively activating at least one of said light emitting devices to signal to the driver of a following motor vehicle that the headlights thereof are on high beam, sensor means mounted at said housing means and connected to said control means, said sensor means operative to activate said switch when the headlights of a following motor vehicle are on high beam, and indicator means passing through said housing means whereby activation of one of more of said light emitting devices can be detected from the back said housing means.

2. The assembly recited in claim 1 wherein, said light emitting devices comprise incandescent light bulbs.

3. The assembly recited in claim 1 wherein, said control means includes means for selectively activating said light emitting devices in a flashing operation.

4. The assembly recited in claim 3 wherein, said control means includes a gear selector of said motor vehicle which selectively activates some of said light emitting devices to indicate operation of said motor vehicle in the reverse direction.

5. The assembly recited in claim 3 wherein, said control means includes a brake pedal of said motor vehicle which selectively activates some of said light emitting devices to indicate operation of said brake pedal.

6. The assembly recited in claim 3 wherein, said control means includes the turn signal controller of said motor vehicle which selectively activates some of said light emitting devices to indicate operation of said turn signal controller.

* * * * *